R. M. LUCAS.
AUTOMATIC LUBRICATOR.
APPLICATION FILED NOV. 13, 1916.
1,274,298.
Patented July 30, 1918.
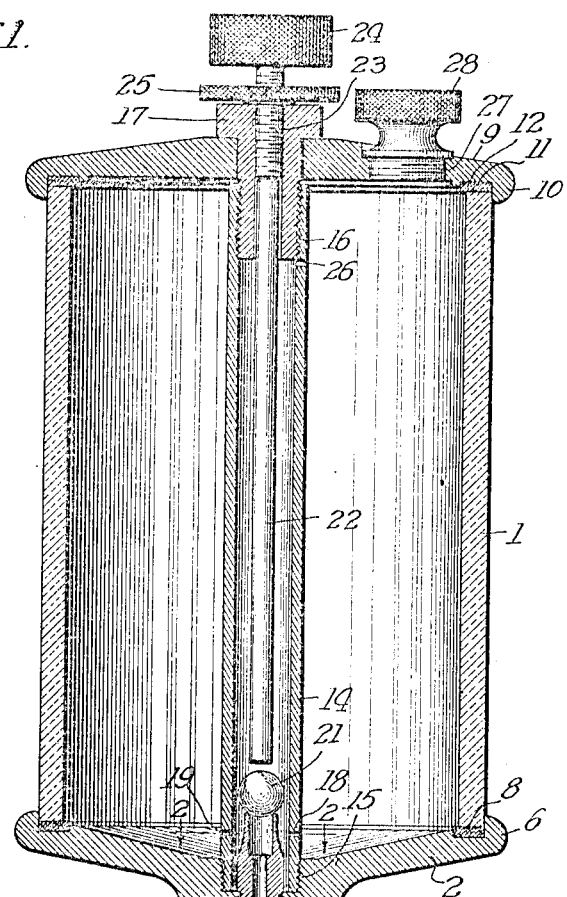
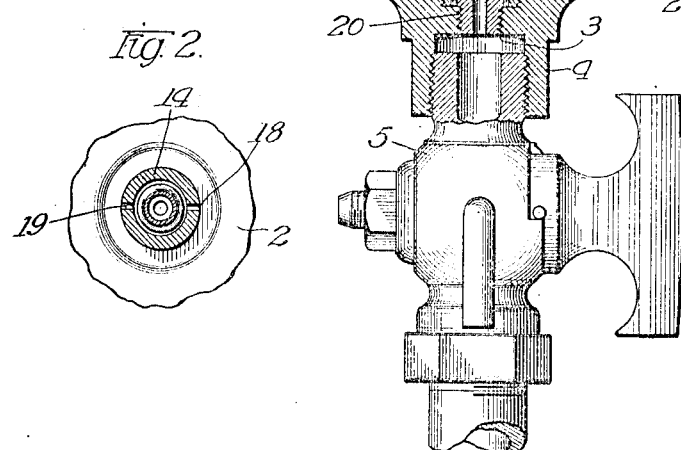

UNITED STATES PATENT OFFICE.

ROBERT M. LUCAS, OF CHICAGO, ILLINOIS.

AUTOMATIC LUBRICATOR.

1,274,298.     Specification of Letters Patent.     Patented July 30, 1918.

Application filed November 13, 1916. Serial No. 130,998.

*To all whom it may concern:*

Be it known that I, ROBERT M. LUCAS, a subject of the King of England, residing at Chicago, in the county of Cook and State of Illinois, have invented certain new and useful Improvements in Automatic Lubricators, of which the following is a description.

My invention relates to mechanism for automatically feeding graphite or other finely divided lubricant to the cylinders of engines, compressors, pumps or the like to lubricate the same.

The object of my invention is to produce a simple, reliable, economical and efficient device of the kind described whereby the amount of lubricant may be accurately controlled as desired, and the feed of lubricant absolutely regular and continuous as long as the cylinder to which my device is attached is in operation.

To this end my invention consists in the novel construction, arrangement and combination of parts herein shown and described, and more particularly pointed out in the claims.

In the accompanying drawings wherein like or similar reference characters indicate like or corresponding parts:

Figure 1 is a central longitudinal section of my device.

Fig. 2 is a fragmentary section taken substantially on line 2—2 of Fig. 1.

My improvement comprises a fluid tight receptacle having an outlet opening in its bottom and an inlet opening in its top with mechanism arranged within the receptacle for controlling the escape of the lubricant through the outlet opening whereby at each pulsation of the mechanism served, a portion of the lubricating material within the receptacle will be fed to the mechanism to be lubricated. In the form shown the receptacle comprises a tubular section 1 formed of any desired material such as brass or steel or where it is desired to permit the inspection of the material within the lubricator a suitably formed glass section may be employed. The bottom plate 2 is preferably provided with a central orifice 3 adapted to serve as the outlet opening for the receptacle with a hub or boss projecting downward for connecting my improved lubricator to the pet-cock 5 or other means for attaching my improvement to the mechanism which it is intended to serve.

As shown the plate 2 is provided with an upwardly projecting marginal flange 6 adapted to engage the exterior, and accurately determine the position, of the tubular part 1 upon the plate. A suitably formed recess 7 is also preferably provided at the inner edge of the flange 6 for receiving a ring of packing material 8 or other suitable means for sealing the joint between the end of the part 1 and face of the part 2.

A cap or cover-plate 9 is also provided at the upper end of the part 1 with a lateral flange 10 adapted to engage the exterior wall of the part 1 to accurately locate the cap upon the part 1. A recess 11 is also provided at the inner edge of the flange 10 to receive the packing material 12 to seal the joint between the parts 1 and 9.

Any suitable means may be provided for connecting the parts 2 and 9 to rigidly maintain the same in position and force their adjacent faces against the extremities of the part 1 to maintain a fluid tight connection between the several parts. In the form shown a depression is formed in the upper or inner face of the part 2 concentric with the outlet opening 3 and a tubular member 14 is inserted in said depression and rigidly secured in position in any desired manner, as for example, by the screw threads 15 formed upon the coöperating parts. The upper end of the member 14 is also rigidly secured to the cap 9 with provision for forcing the bottom plate 2 and cap toward each other. As shown the inner wall of the part 14 is screw-threaded as at 16 and a cap screw 17 extends through a central opening in the cap 9 and engages the threads in the part 14 for this purpose.

Suitable ports 18 and 19 are provided at the lower end of the member 14 for permitting the lubricant within the receptacle to pass into the tubular member 14 on its way to the outlet 3. Suitable means are also provided to control the escape of lubricant through the tubular member 14. As shown a tubular part 20 is rigidly secured in position in the out-let opening 3 with its upper end extending into the tubular member 14 a sufficient distance beyond the ports 18 and 19 to prevent the possibility of any lubricant entering the member 14 through the ports from directly flowing into the upper end of the part 20.

In the preferred construction a ball 21 formed of steel or other suitable material is provided within the member 14 adapted to serve as a closure for the upper end of the part 20 which is preferably recessed at its upper end to form a slight chamber below the ball and provide a suitable seat for the ball; the upper end of the part 20 is also preferably reduced in size from a point slightly below the ports 18 and 19 to afford an ample passage for the lubricant entering the member 14 and preventing any tendency to become packed or clogged in this portion of the device. When thus constructed each impulse in the cylinder to which my improved lubricator is attached will raise the ball 21 from its seat upon the part 20 and a portion of the lubricating material at the lower end of the member 14 will be drawn into the outlet opening as the ball is reseated, the amount depending to a considerable extent upon the distance the ball 21 is raised from its seat. Any suitable means may be provided to control the movement of the ball 21. As shown a stem 22 is positioned centrally of the tubular member 14 extending longitudinally thereof with its upper end screw threaded as at 23 and provided with a knob 24 upon the exterior of the receptacle so that by rotating the knob 24 the stem 22 may be adjusted longitudinally of the member 14, the lower end of the stem being in a position to engage the ball and limit its vertical movement in the member.

Suitable means are also provided for locking the stem 22 in its adjusted position, as for example, the jam-nut 25 adjacent the knob 24 which may be forced against the upper end of the cap-screw 17 to rigidly lock the stem 22 in position. In the preferred construction also an opening 26 is provided at the upper end of the tubular member 14 to permit an equalization of the pressure within the member 14 and the remainder of the receptacle 1.

An opening 27 is also provided in the cap 9 for introducing the lubricant into the receptacle and a suitably formed plug 28 is provided for closing the opening 27 and preventing the escape of fluid at this point. In service my improved lubricator is attached to the steam line of an engine for lubricating the steam cylinder or to any desired portion of the pressure cylinders of an air compressor or internal combustion or steam engine cylinders or any mechanism requiring lubrication where a pulsation in the fluid pressure will occur in a fixed ratio to the quantity of lubricant required. When thus connected the lubricant is placed within the receptacle 1, the plug 28 inserted and valve 5 opened to permit the fluid pressure from the cylinder to be lubricated to reach the ball 21 and the lubricant to pass from the receptacle to the cylinder. The stem 22 is then adjusted to control the amount of lubricant admitted at each pulsation after which my device requires no further attention as lubricant is only admitted at each pulsation of the cylinder and completely excluded when the cylinder is not in action; this renders my improved lubricator especially desirable for steam hammers, pile drivers or the like where the action of the steam cylinders are intermittent, many periods occurring where the device is entirely inactive and requires no lubrication whatever.

Having thus described my improvement it is obvious that various immaterial modifications may be made in my device without departing from the spirit of my invention, hence I do not wish to be understood as limiting myself to the exact form or construction shown.

What I claim as new and desire to secure by Letters Patent is:

1. In a device of the kind described, a fluid tight receptacle having an outlet in its bottom, a tubular part within said receptacle inclosing said outlet and extending longitudinally of said receptacle and provided with a port near its lower end, in combination with a tubular member rigidly secured in position in said outlet and extending into said tubular part beyond said port, means for controlling the opening through said member and means extending through the wall of said receptacle for controlling the operation of said controlling means.

2. In a device of the kind described, a fluid tight receptacle having an outlet in its bottom, a tubular part within said receptacle rigidly connecting the top and bottom of said receptacle inclosing said outlet and extending longitudinally of said receptacle and provided with a port near its lower end, in combination with a tubular member rigidly secured in position in said outlet and extending into said tubular part beyond said port, a movable member within said tubular part coöperating with the end of said tubular member for controlling the opening through said member and means extending through the wall of said receptacle for controlling the operation of movable member.

3. In a device of the kind described, a fluid tight receptacle having an outlet in its bottom, a tubular part within said receptacle rigidly connecting the top and bottom of said receptacle inclosing said outlet and extending longitudinally of said receptacle and provided with a port near its lower end, in combination with a tubular member threadedly secured in position in said outlet and extending into said tubular part beyond said port, means for controlling the opening through said member and means extending through the wall of said receptacle for controlling the operation of said controlling means.

4. In a device of the kind described, a fluid tight receptacle having an outlet in its bottom, a tubular part within said receptacle inclosing said outlet and extending longitudinally of said receptacle and provided with a port in its lower end, in combination with a tubular member rigidly secured in position within the outlet opening and extending into said tubular part beyond said port, said tubular member having a relatively large chamber at its upper end and means for controlling the opening through said member.

5. In a device of the kind described, a fluid tight receptacle having an outlet in its bottom, a tubular part within said receptacle inclosing said outlet and extending longitudinally of said receptacle and provided with a port in its lower end, in combination with a tubular member threadedly secured in position within the outlet opening and extending into said tubular part beyond said port, the outer wall of the upper portion of said tubular member being gradually tapered from a point slightly below the port within the tubular part and means for controlling the opening through said member.

In testimony whereof, I have hereunto signed my name in the presence of two subscribing witnesses.

ROBERT M. LUCAS.

Witnesses:
BLANCHE CHALMERS,
BURTON U. HILLS.

Copies of this patent may be obtained for five cents each, by addressing the "Commissioner of Patents, Washington, D. C."